United States Patent [19]

Ledeen et al.

[11] 4,051,676
[45] Oct. 4, 1977

[54] HYDRAULIC VALVE ACTUATOR

[75] Inventors: Howard L. Ledeen, Pasadena; Franz Schmon, Granada Hills; Willem E. Tupker, Sylmar, all of Calif.

[73] Assignee: Ledeen Flow Control Systems, Inc., Sun Valley, Calif.

[21] Appl. No.: 670,254

[22] Filed: Mar. 25, 1976

[51] Int. Cl.² .......................... F15B 1/02; F15B 20/00
[52] U.S. Cl. ........................................ 60/404; 60/416; 60/DIG. 4; 91/420; 137/112
[58] Field of Search ................. 60/403, 404, 405, 406, 60/416, 903, 458, DIG. 4; 91/28, 420; 137/112, 113, 255

[56] References Cited

U.S. PATENT DOCUMENTS

| 2,396,984 | 3/1946 | Broadston et al. | 60/404 |
| 2,618,243 | 11/1952 | Treganowan | 91/420 X |
| 3,513,751 | 5/1970 | Escobosa | 137/113 X |
| 3,680,311 | 8/1972 | Harbonn et al. | 60/404 |

Primary Examiner—Edgar W. Geoghegan
Attorney, Agent, or Firm—Melvin R. Stidham

[57] ABSTRACT

An emergency hydraulic ram valve actuator having redundant power sources and controls. At least two pressure fluid sources, such as hydraulic accumulators, are connected through separate controls to the cylinder head. Check valves in the cylinder head and base prevent outward flow to insure containment of the fluid even when dismantled for service. Both sets of controls are contained in manifolds connected between the pressure sources and pressure and exhaust lines to and from the cylinder. Flow from each accumulator is normally prevented by a pilot check valve, but selectively operated valves initiate flow which, in turn, biases the pilot check valves to full flow. As full flow commences a portion thereof is diverted to open the exhaust pilot check valves which allow cylinder evacuation. In the event one power and/or control system is disabled, the other will function independently. The pressure and exhaust lines are contained within protective shields throughout their lengths.

8 Claims, 8 Drawing Figures

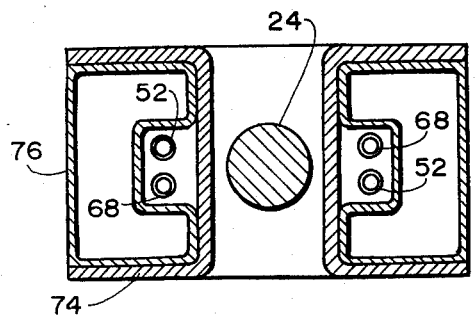
Fig. 2
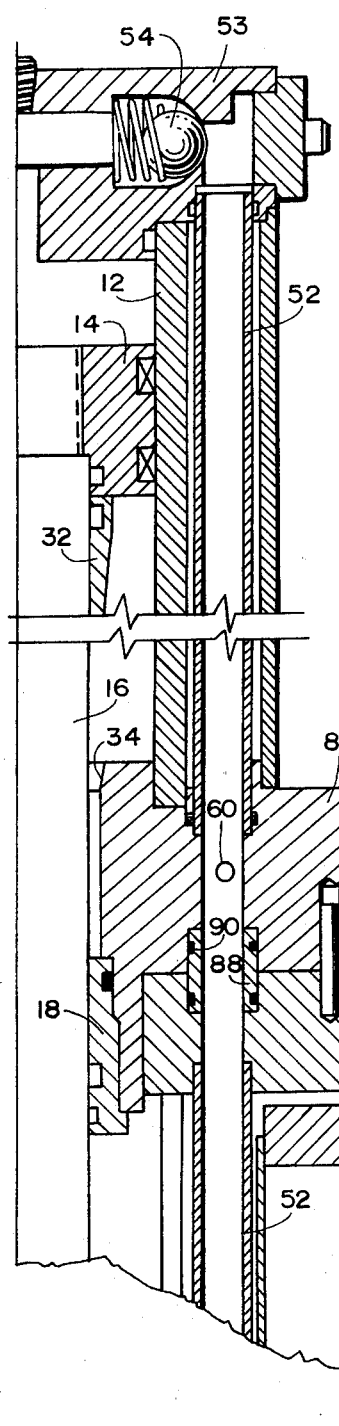
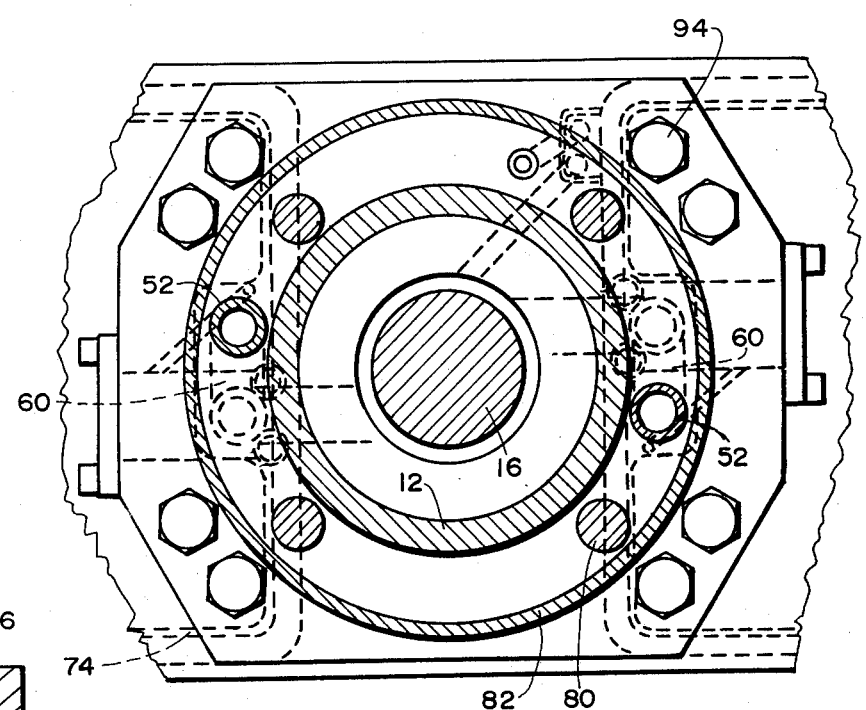
Fig. 3
Fig. 4

HYDRAULIC VALVE ACTUATOR

BACKGROUND OF THE INVENTION

In certain installations where emergency valve operation is required, it may be of critical importance that the valves be reliable and rapid in operation. For example, in nuclear power generating stations the rupture of a line containing feed water or coolant precipitates an emergency situation requiring isolation of the ruptured section by immediate closure of a valve. On the other hand, an emergency involving a reactor may produce a need for rapid opening of a valve as to douse the reactor or to flood a compartment. Such line ruptures could be precipitated by seismic forces, such as earthquake, or by explosion through sabotage or by missile. While such rapid valve operation may be required, it is also important that the valve closure member not impact with its seat with such momentum as to cause valve damage which would impair or prevent future valve operation. It is also vital concern that the valve actuator be reliable and capable in operation dispite damage or defects. It is further essential that the valve actuator be so constructed as to enable repair and replacement of parts quickly in order to minimize time of human exposure to the nuclear environment.

OBJECTS OF THE INVENTION

It is an object of this invention to provide a valve actuator which is reliable in operation and capable of producing rapid valve closing or opening.

It is a further object of this invention to provide a valve actuator which can produce rapid valve operation without impact damage.

It is a further object of this invention to provide a valve actuator which is capable of operation despite damage to hydraulic and electric components.

It is a further object of this invention to provide a valve actuator which is adapted for rapid removal and replacement of parts.

It is a further object of this invention to provide a valve actuator wherein vital components are afforded maximum protection against damgage from external forces.

It is a further object of this invention to provide a hydraulic valve actuator with means for delivering a fluid under pressure, even in the event of power failure.

It is a further object of this invention to provide a hydraulic valve actuator with a self-contained source of fluid power.

Other objects and advantages of this invention will become apparent from the description to follow, particularly when read in conjunction with the accompanying drawings.

SUMMARY OF THE INVENTION

In carrying out this invention, there is provided a hydraulic ram actuator capable of closing or opening a linear-operated valve, such as a gate valve, at high velocity towards its emergency position and then braking the final increment of movement to prevent high impact while insuring positive sealing engagement. The cylinder is operated by two separate hydraulic systems, each with its own power fluid source and controls. Ball check valves in the cylinder head and pilot-operated check valves in the base, prevent flow from the cylinder to insure fluid containment and an operation-ready condition despite damage or rupture in connecting conduits. Further, the cylinder can be removed and serviced without loss of fluid therein. Each of the two separate hydraulic systems is capable of driving the hydraulic ram alone or jointly with the other system, as each has a pressure duct connected to the cylinder head and an exhaust duct connected to the base, both of which pass through a hydraulic manifold on which are carried accumulators as a self-contained power source, capable of delivering fluid under pressure, even in absence of externally supplied power. The manifold includes a pilot operated check valve which normally closes the pressure line and a selectively controlled "trigger" valve in the inlet line from the accumulator. Operation of the selectively controlled "trigger" valve initiates flow to open the manifold pilot check valve and generate full flow to the cylinder head, a portion of which is diverted to operate the exhaust pilot check valve at the base of the cylinder and enable evacuation ahead of the piston during the power stroke. The systems are capable of working together or independently and because of the check valves, in the cylinder itself, as above described, damage or even rupture of one hydraulic system will not impair operation of the other. The "trigger" valve is of the quick-acting type whereby it may be opened and closed for partial operation of the hydraulic ram for occasional exercise cycles to insure operation in an emergency. The cylinder interface with the cylinder support base utilized spigot connections to facilitate removal and replacement of the cylinder assembly and both pressure and exhaust lines are protected by shielding structures throughout their lengths.

BRIEF DESCRIPTION OF THE DRAWINGS

In the drawings:

FIG. 2 is a horizontal section view taken along line 2—2 of FIG. 1;

FIG. 3 is a section view taken along line 3—3 of FIG. 1;

FIG. 4 is an enlarged partial section view showing details of construction;

DESCRIPTION OF A PREFERRED EMBODIMENT

Figure 1:
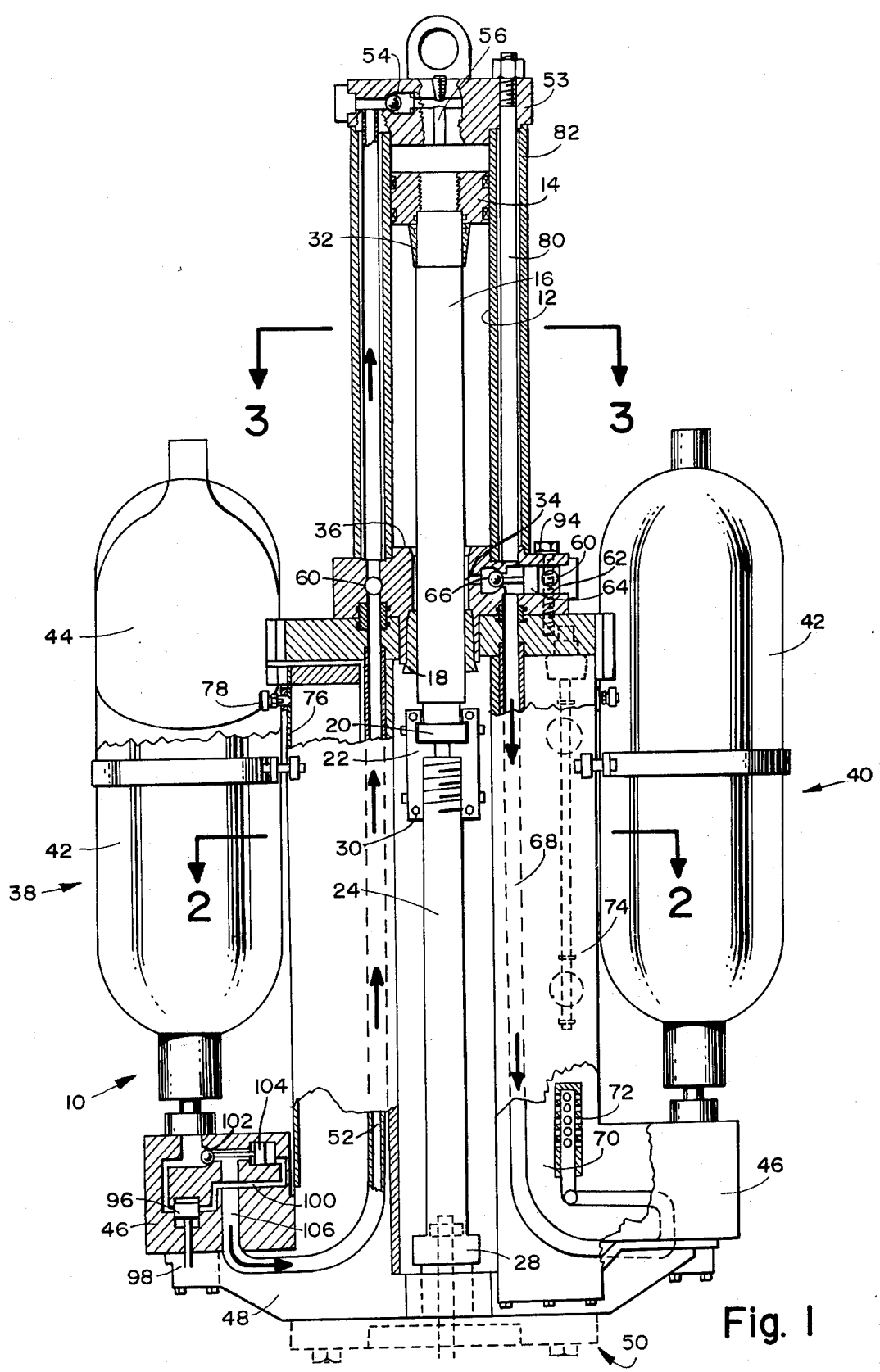
FIG. 1 is a view partially in section of a valve actuator embodying features of this invention.

Referring now to FIG. 1 with greater particularity, the emergency valve actuator 10 of this invention comprises a cylinder 12 in which a piston 14 is reciprocable, with the piston rod 16 being slidably carried in a sealed bearing member 18. The protruding end 20 of the piston rod 16 is secured, as by means of a split coupling sleeve 22, to the stem 24 of a valve, such as a gate valve (not shown) whereby downward movement of the piston 14 from the position shown moves the gate toward closed position. The piston rod coupling 22 may be in the form of a split sleeve, the halves of which are secured together as by means of bolts 30.

A tapered sleeve 32 carried on the piston rod 16 just below the piston 14 is received in a restricted receptacle 34 in the base 36 of the cylinder 12, through which fluid exhausts, so as to retard movement of the piston at the lower end of its stroke and "soften" the seating of the gate in the valve. Hence, the piston 14 can be driven downward at a rapid rate for a quick closing acting in an emergency, with the momentum being greatly reduced at the end of the stroke to avoid possible valve damage.

The hydraulic ram is operated by two identical hydraulic systems 38 and 40 which function together, or as will be described, either system can operate the valve efficiently in the event of failure of the other. The systems being identical, a single set of reference numerals will be used to describe both.

For normal emergency use, the redundant power sources for driving the ram are hydraulic accumulators 42, in which are contained charges of hydraulic fluid maintained under pressure. The accumulators may be of the bladder type wherein a bladder 44 contained in the chamber 42 is maintained at a desired pressure level determined by a charge of pressurized gas. A valve manifold 46 is carried on a firm base member 48, which is mounted on the valve bonnet 50. The valve manifold 46 also supports the accumulator 42, and functions when opened to deliver a hydraulic fluid from the accumulator through the vertical pressure conduit 52 upward to the top of the cylinder 12 and then laterally inward the cylinder head 53, past check valves 54 to an inlet port 56 into the cylinder to drive the piston down. As this pressurized fluid flows upward through the pressure line, 52, a portion of its flows through a lateral passage 60 into a small cylinder 62 of a pilot check valve, forcing a piston 64 radially inward in FIG. 1 to push the check valve 66 away from the port and allow exhaust fluid ahead of the piston 14 to flow thereby.

With the pilot check valve 66 open, fluid below the piston is allowed to evacuate out through the receptacle-passageway 34, past the check valve 66 and down through an exhaust line 68 to exit into a sump 70 carried on the framework. A ported cap 72 may be carried on the exit end of the exhaust line 68 to minimize foaming.

As shown more clearly in FIG. 2 the pressure fluid lines 52 and exhaust lines 68 for the redundant fluid systems 38 and 40, are actually carried side by side in pairs within rigid, upright channel members 74 which extend parallel to, and on opposite sides of, the valve stem 24. Also shielded within the channel members 74 are the sump casings 76 at the upper end of which are mounted relief valves 78 (FIG. 1).

Surrounding the upper extensions of the pressure fluid ducts 52, as well as extended studs 80 which retain the cylinder head 53, is a generally cylindrical protective cowling 82. Hence, from top to bottom, the hydraulic conduits 52 and 68 are shielded against impact and other damaging effects.

Referring now to FIG. 4, there are illustrated the spigot fluid line couplings which greatly facilitate disassembly, repair and reassembly of the operator 10. For example, the lower portions of the fluid lines 52 or 68 are welded into the cylinder support base 84 and the ends of the upper portions of ducts 52 are received in passages bored into the cylinder head 53 and base 86 with seals, such as O-rings, rendering them fluid-tight. The connection between cylinder base 86 and support base 84 is sealed by a sleeve 88 carrying O-rings 90. Positioning is facilitated by dowel pins 92. Hence, the cylinder may be removed simply by removing a few screws 94 (FIG. 1) and separating the split valve stem coupling 22. The cylinder 12 may then be rapidly replaced and the continuous, fluid-tight ducts 52 and 68 are automatically reassembled. The check valves 54 in the cylinder head and in the cylinder base 86 prevent fluid spillage when the cylinder is removed.

Referring again to FIG. 1, operation of the valve actuator 10 is initiated or triggered by opening slide valves 96 in the manifolds 46. This could be done manually, mechanically or, as shown for instant remote operation, by means of a solenoid 98. The opening of the trigger slide or poppet valve 96 enables flow of fluid from the accumulator 42 through a pilot passage 100 to open a normally closed pilot check valve 102 by forcing the piston 104 to the left in FIG. 1. This opens full fluid flow through the accumulator outlet 106 to the pressure fluid line 52. As the fluid rises in the pressure lines 52 on both sides of the cylinder 12, portions thereof are diverted through cross ports 60 to drive the small pilot pistons 62 radially inward to open the pilot check valves 66, thus enabling evacuation of the cylinder 12 from below the piston 14 through the lines 68, as the piston is driven down by fluid entering through the pressure ports 56.

The hydraulic fluid flowing at high velocity through the lines 52 under high pressure forces the piston 14 down at a rapid rate to insure quick closure of the valve (not shown). Prior to full completion of the valve closure, the sleeve 32, which is carried below the piston 14 enters the restricted passage 34, whereby exhaust flow past the pilot check is greatly retarded, and downward motion of the valve gate is braked to minimize impact with its seat and prevent damage to the seating parts.

It should be noted that the trigger valves 96 in the manifolds are capable of quick operation whereby they may be shut off after a fraction of the full stroke of piston 14 in an exercise cycle for test purposes. Thereafter, the accumulators 42 may be recharged, and the cylinder returned to its valve-open position as shown in FIG. 1, as will hereinafter be described.

While this actuator operation has been described in connection with a valve closing operation, it is equally obvious that the actuator 10 could be operated to open a valve under emergency conditions, as when it is desired to douse a reactor or floor a compartment.

Figure 5:
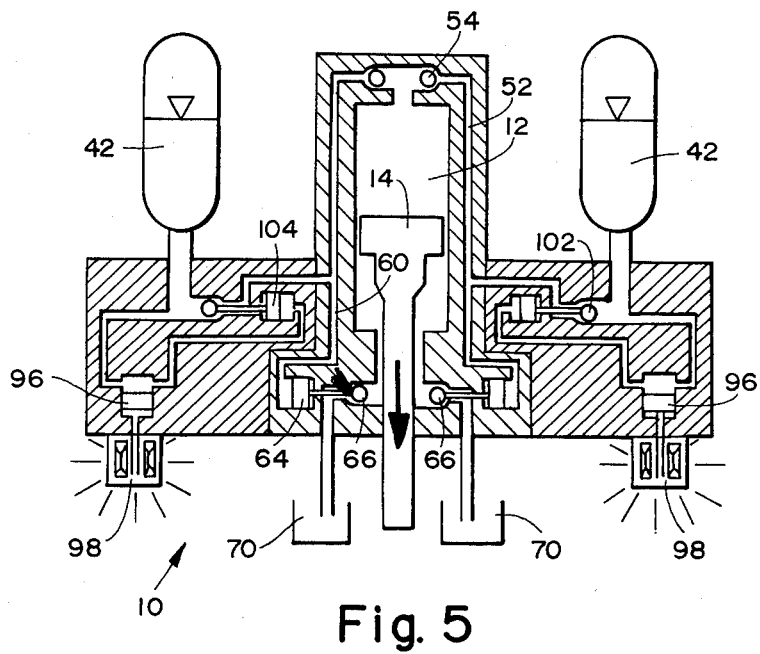
FIG. 5 is a schematic illustration showing normal operation of the actuator.

Referring now to the schematic illustration of FIG. 5, the system 10 is shown in normal, redundant operation with both solenoids 98 energized and slide valves 96 opened to enable flow from the accumulators 42 to open the pilot check valves 102, 104 and commence flow through the pressure fluid lines 52 to unseat the check valves 54 and drive the piston 14 down. A portion of the fluid flowing past the pilot check valves 102 is diverted through the cross-over 60 to open the pilot check 64, 66 and enable exhaust flow from below the piston 14 to the sumps 70.

Figure 6:
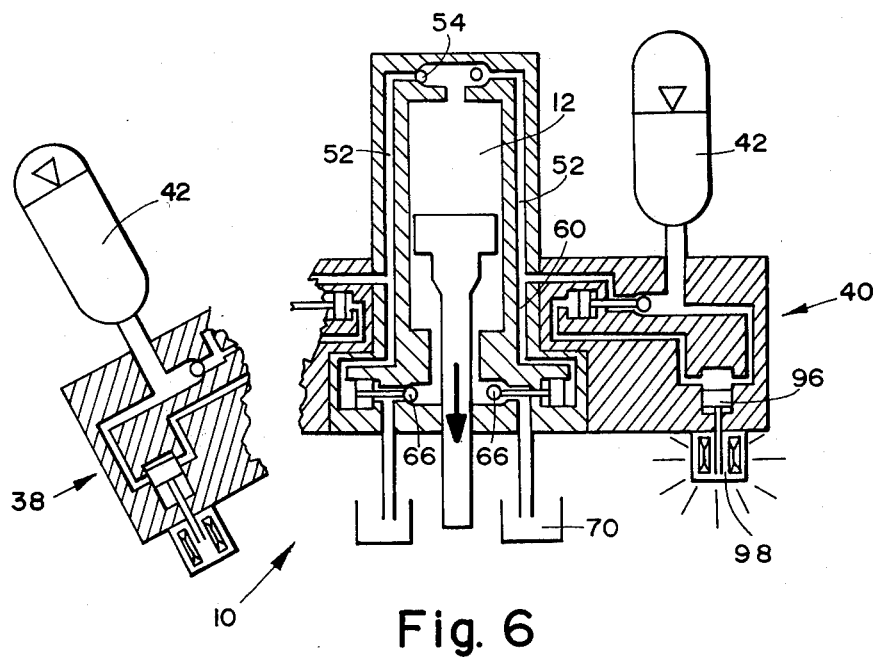
FIG. 6 is a schematic illustration showing operation of the actuator despite damage to one hydraulic system.

FIG. 6 illustrates schematically that the operator 10 will close in an emergency, even in the event of malfunction or severe damage to one of the hydraulic systems 38 or 40. There, the unit 38 is shown completely broken away such as might occur in the event of an explosion, missile, sabotage or the like. Still, the unit 40 is capable of functioning as above-described. The check valve 54 on the left side prevents flow of fluid from the pressure fluid line 52 to flow out through the corresponding line on the left and the check pilot valve 66 on the left remains closed to prevent exhaust flow to the damaged system.

Figure 7:
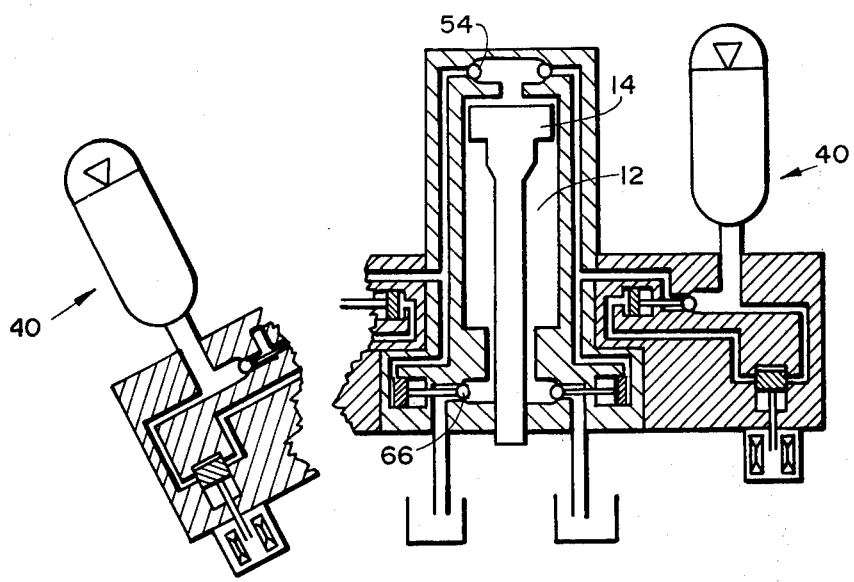
FIG. 7 is a schematic illustration showing stability of the actuator despite damage to one hydraulic system.

In FIG. 7, it is illustrated that the system will not, on the other hand, close accidentally in the event of damage to one of the systems 38 or 40. There, despite complete severence of the unit 38 the check valves 54 and 66 remain closed (by spring force not shown) to insure containment of the fluid within the cylinder 12 and lock the piston 14 in place.

Figure 8:
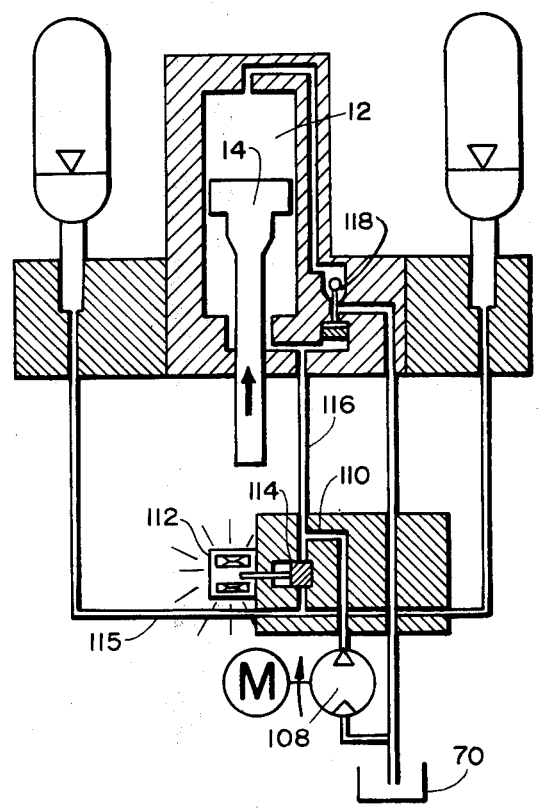
FIG. 8 is a schematic illustration showing a recharging of the system.

Referring now to FIG. 8, there is shown a system for recharging the accumulators and moving the actuator to open position. As there shown, a motor driven pump 108 delivers fluid from a sump 70 through a manifold line 110. With the solenoid 112 energized as shown, a slide valve 114 is in closed position to block flow through the lines 115 and enable flow through the line 116 opening into the bottom of the cylinder 12 to drive the piston 14 upwardly. At the same time, a portion of the flow acts against a pilot check valve 118 to allow flow from the top of the cylinder 12 to the sump 70. Then, with the solenoid deenergized, and the piston 14 in its elevated position, the valve 114 opens the lines 115 to recharge the accumulators by continued pumping from the sump 70 through lines 110 and 115.

While this invention has been described in conjunction with a preferred embodiment thereof, it is obvious that modifications and changes therein may be made by those skilled in the art without departing from the spirit and scope of this invention, as defined by the claims appended hereto.

What is claimed as invention is:

1. An emergency valve actuator comprising:
   a cylinder;
   a piston reciprocable in said cylinder;
   a pair of pressure fluid sources;
   separate pressure ducts connecting said sources to inlet ports in said cylinder on one side of said piston;
   separate exhaust ducts connecting outlet ports in said cylinder on the other side of said piston to an evacuation zone;
   first check valve means in said inlet ports and pilot-operated check valves in said outlet ports, all blocking outward flow therethrough;
   each of said pilot-operated check valves being exposed to fluid in one of said pressure ducts and being operative in response to flow therethrough to move to open position; and
   selectively operable valve means connected into each of said pressure ducts.

2. Emergency valve actuator defined by claim 1 wherein said last-named means comprises:
   a manifold having a flow duct connected between one of said pressure fluid sources and one of said pressure ducts;
   a normally closed pilot valve in said flow duct conditioned to be opened in response to fluid pressure;
   a pilot duct in said manifold connected between said one source and said pilot valve; and
   a selectively operated valve in said pilot duct.

3. The emergency valve actuator defined by claim 1 wherein each of said source of pressure fluid comprises:
   an accumulator tank;
   a pressure-responsive member separating said tank into two chambers;
   one chamber, with which a pressure duct is in communication, being filled with a hydraulic fluid; and
   the other chamber being charged with gas under pressure.

4. The emergency valve actuator defined by claim 1 wherein:
   upper segments of said pressure ducts extend along the outer surface of said cylinder; and including:
   a protective shroud embracing said cylinder and pressure duct segments.

5. The emergency valve actuator defined by claim 4 including:
   generally parallel protective pedestal enclosures;
   a common cylinder support base on said enclosures adapted to support said cylinder with the piston rod extending between said pedestal enclosures; and
   lower segments of said pressure ducts and said exhaust ducts being carried within the said enclosures with the upper ends thereof received in said support base.

6. The emergency valve actuator defined by claim 4 including:
   a cylinder head containing said inlet ports secured over one end of said cylinder and shroud; and
   a cylinder base containing said outlet ports secured over the other end of said cylinder and shroud; said cylinder head and base being bored to receive the ends of said upper pressure duct segments.

7. The emergency valve actuator referred by claim 6 including:
   a series of aligned passageways in said support base and said cylinder extending between upper and lower segments of said pressure ducts and between said outlet ports and said exhaust ducts;
   tubular members received in each corresponding pair of said aligned passageways; and
   seal means around said tubular members.

8. The emergency valve actuator defined by claim 6 wherein:
   said check valves and said pilot-operated check valves are mounted in said cylinder head and said cylinder base, respectively.

* * * * *